(12) United States Patent
Mimura et al.

(10) Patent No.: US 11,485,280 B2
(45) Date of Patent: Nov. 1, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yoshitaka Mimura, Wako (JP); Yasushi Shoda, Wako (JP); Junpei Noguchi, Wako (JP); Yuki Hara, Wako (JP); Katsuyasu Yamane, Wako (JP); Hiroshi Yamanaka, Wako (JP); Ryoma Taguchi, Tokyo (JP); Yuta Takada, Tokyo (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 374 days.

(21) Appl. No.: 16/792,970

(22) Filed: Feb. 18, 2020

(65) Prior Publication Data

US 2020/0269748 A1 Aug. 27, 2020

(30) Foreign Application Priority Data

Feb. 26, 2019 (JP) .............................. JP2019-033238

(51) Int. Cl.
*B60Q 1/44* (2006.01)
*H05B 47/16* (2020.01)
*H05B 47/125* (2020.01)

(52) U.S. Cl.
CPC ............ *B60Q 1/442* (2013.01); *H05B 47/125* (2020.01); *H05B 47/16* (2020.01); *B60Q 2400/50* (2013.01)

(58) Field of Classification Search
None
See application file for complete search history.

(56) References Cited

U.S. PATENT DOCUMENTS

| 10,482,226 | B1 * | 11/2019 | Konrardy ............. G06F 16/2455 |
| 11,021,098 | B1 * | 6/2021 | Brown .................. B60Q 1/323 |
| 2018/0181359 | A1 * | 6/2018 | Monroe .................. B60Q 3/51 |

FOREIGN PATENT DOCUMENTS

| JP | 2007-090938 | 4/2007 |
| JP | 2017-159882 | 9/2017 |
| JP | 2017-189998 | 10/2017 |
| JP | 2017-226371 | 12/2017 |
| WO | 2018/213075 | 11/2018 |

OTHER PUBLICATIONS

Japanese Office Action for Japanese Patent Application No. 2019-033238 dated Mar. 1, 2022.

* cited by examiner

*Primary Examiner* — Dedei K Hammond
(74) *Attorney, Agent, or Firm* — Amin, Turocy & Watson, LLP

(57) ABSTRACT

A vehicle control device mounted in a vehicle includes: a first recognizer configured to recognize a person near the vehicle; a first determiner configured to determine whether the person recognized by the first recognizer is a pre-registered user; and a controller configured to control a lighting device to project a projection image to a position for which a stop position of the vehicle is a criterion in a case where the first determiner determines that the person recognized by the first recognizer is the pre-registered user.

14 Claims, 13 Drawing Sheets

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2019-33238, filed on Feb. 26, 2019, the contents of which are hereby incorporated by reference into the present application.

BACKGROUND OF THE INVENTION

Field of the Invention

The present invention relates to a vehicle control device, a vehicle control method, and a storage medium.

Description of Related Art

In recent years, studies of automated vehicle control have been conducted. In relation to this technology, devices recognizing a person who appears on a road and then notifying the person that a vehicle recognizes the region in which the person has appeared by radiating laser light at the feet of the person are known (for example, see Japanese Unexamined Patent Application, First Publication No. 2017-159882). Devices that support a parking operation of a vehicle by radiating line markers to a road surface near the vehicle are known (for example, see Japanese Unexamined Patent Application, First Publication No. 2007-90938).

When a process of returning a vehicle in automated valet parking using an automated driving technology is performed, a user of the vehicle (for example, an owner) requests return of the vehicle using a terminal device or the like and then meets the vehicle that has moved to a predetermined boarding area through automated driving control and boards the vehicle. The user of the vehicle may not be aware of a position in the boarding area at which the vehicle stops, and thus may be forced to move unnecessarily in the boarding area or it may take time to board the vehicle in some cases.

The present invention is devised in view of such circumstances and an objective of the present invention is to provide a vehicle control device, a vehicle control method, and a storage medium capable of realizing efficient boarding by notifying a user of a stop position of a vehicle.

SUMMARY OF THE INVENTION

A vehicle control device, a vehicle control method, and a storage medium according to the present invention adopt the following configurations.

(1) According to an aspect of the present invention, a vehicle control device mounted in a vehicle includes: a first recognizer configured to recognize a person near the vehicle; a first determiner configured to determine whether the person recognized by the first recognizer is a pre-registered user; and a controller configured to control a lighting device to project a projection image to a position for which a stop position of the vehicle is a criterion in a case where the first determiner determines that the person recognized by the first recognizer is the pre-registered user.

(2) In the vehicle control device according to the aspect (1), the controller is configured not to control the lighting device in a case where the first recognizer recognizes no person or the first determiner determines that the person recognized by the first recognizer is not the pre-registered user.

(3) The vehicle control device according to the aspect (1) or (2) may further include a second determiner configured to determine the stop position based on a position of the person determined to be the pre-registered user by the first determiner.

(4) In the vehicle control device according to the aspect (3), the second determiner is configured to determine a predetermined position in a stop area as the stop position in a case where the first recognizer recognizes no person or the first determiner determines that the person recognized by the first recognizer is not the pre-registered user.

(5) The vehicle control device according to the aspect (3) or (4) may further include a second recognizer configured to recognize an object which is in the stop area, the second determiner is configured to determine a stoppable position different from a position of the person as the stop position in a case where the first determiner determines that the person recognized by the first recognizer is the pre-determined user and the second recognizer recognizes an object disturbing stopping of the vehicle at the position of the person.

(6) In the vehicle control device according to any one of the aspects (1) to (5), the controller is configured to control an indicator mounted in the vehicle to change an operation mode of the indicator based on a distance from a present position of the vehicle to the stop position.

(7) In the vehicle control device according to the aspect (6), the controller is configured to control the indicator to change a blinking speed of the indicator.

(8) In the vehicle control device according to the aspect (6) or (7), the controller is configured to control the lighting device to stop the projection of the projection image before the indicator is controlled.

(9) In the vehicle control device according to any one of the aspects (1) to (8), the controller is configured to control a windshield of the vehicle to make a state of the windshield of the vehicle while the vehicle is moving to the stop position through automated driving control be different from the state of the windshield of the vehicle after the vehicle arrives at the stop position.

(10) In the vehicle control device according to any one of the aspects (1) to (9), the controller is configured to control a projection device to project an image recognizable from outside of the vehicle to a driving seat of the vehicle while the vehicle is moving to the stop position through automated driving control.

(11) In the vehicle control device according to any one of the aspects (1) to (10), the controller is configured to control the lighting device to radiate light to the person determined to be the pre-registered user by the first determiner.

(12) In the vehicle control device according to the aspect (11), the controller is configured to control the lighting device to change a body part of the person to which the light is radiated based on illuminance outside of the vehicle.

(13) According to another aspect of the present invention, there is provided a vehicle control method causing a computer of a vehicle control device mounted in a vehicle to: recognize a person near the vehicle; determine whether the recognized person is a pre-registered user; and control a lighting device to project a projection image to a position for which a stop position of the vehicle is a criterion in a case where the recognized person is determined to be the pre-registered user.

(14) According to still another aspect of the present invention, there is provided a computer-readable non-transitory storage medium storing a program that causes a computer of a vehicle control device mounted in a vehicle to: recognize a person near the vehicle; determine whether the recognized person is a pre-registered user; and control a lighting device to project a projection image to a position for which a stop position of the vehicle is a criterion in a case where the recognized person is determined to be the pre-registered user.

According to the aspects (1) to (5) and (11) to (14), by notifying a user of a user of a stop position of the vehicle, it is possible to realize efficient boarding. The user of the vehicle can be aware of a position at which the vehicle stops in a boarding area, can avoid unnecessary movement in the boarding area, and can shorten a boarding time. It is possible for the vehicle to recognize the user, and thus it is possible to realize efficient boarding by determining a stop position based on the position of the user of the vehicle.

According to the aspects (6) to (8), the user of the vehicle can easily and accurately be aware of an operation state of the own vehicle until the vehicle reaches the stop position.

According to the aspects (9) and (10), a person outside of the vehicle can easily be aware of that the vehicle is being automatically driven.

DETAILED DESCRIPTION OF THE INVENTION

Hereinafter, an embodiment of a vehicle control device, a vehicle control method, and a storage medium according to the present invention will be described with reference to the drawings. The vehicle control device according to the present invention notifies a user of a vehicle of a stop position of the vehicle by projecting a projection image to a position for which the stop position of the vehicle is a criterion using a lighting device mounted in the vehicle. The lighting device is, for example, a headlight (a headlamp), a backlight (a backup lamp), or another light-emitting device provided to project a projection image. Hereinafter, a case in which a lighting device is a headlight will be described as an example. Hereinafter, a case in which a user of a vehicle is notified of a stop position of the vehicle when a returning process of automated valet parking is performed will be described as an example. Hereinafter, a case in which laws and regulations for left-hand traffic are applied will be described. However, when laws and regulations for right-hand traffic are applied, the left and right may be reversed.

First Embodiment

[Overall Configuration]

Figure 1:
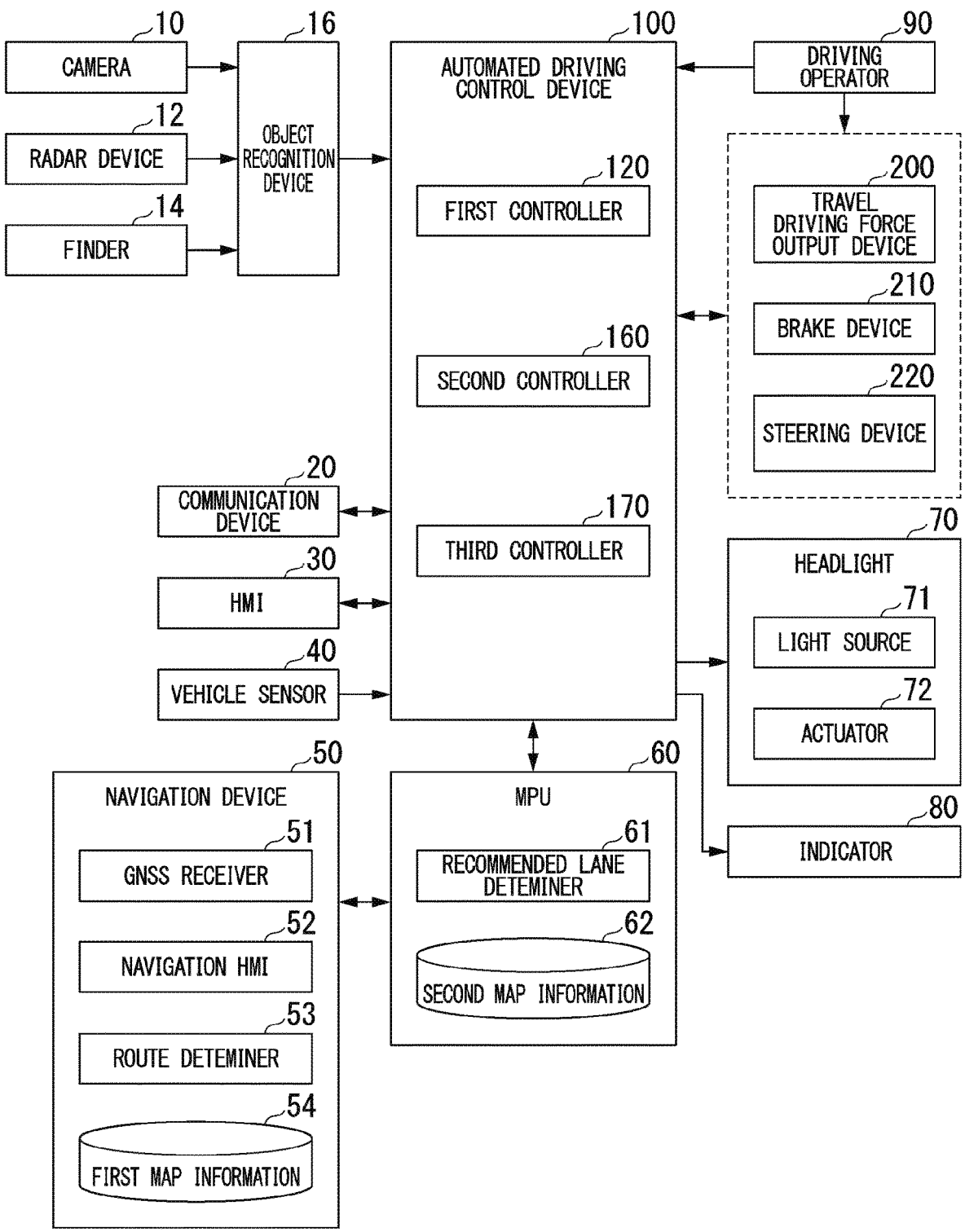
FIG. 1 is a diagram showing a configuration of a vehicle system in which a vehicle control device according to a first embodiment is used.

FIG. 1 is a diagram showing a configuration of a vehicle system 1 in which a vehicle control device according to a first embodiment is used.

A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, and a combination thereof. The electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a headlight 70, an indicator 80, a driving operator 90, an automated driving control device 100 (an example of a "vehicle control device"), a travel driving force output device 200, a brake device 210, and a steering device 220. The devices and units are connected to one another via a multiplex communication line such as a controller area network (CAN) communication line, a serial communication line, or a wireless communication network. The configuration shown in FIG. 1 is merely exemplary, part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on any portion of a vehicle in which the vehicle control system 1 is mounted (hereinafter referred to as an own vehicle M). For example, when the camera 10 images a front side, the camera 10 is mounted on an upper portion of a front windshield, a rear surface of a rearview mirror, and the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance and an azimuth) of the object. The radar device 12 is mounted on any portion of the own vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any portions of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without any change. The object recognition device 16 may be excluded from the vehicle system 1.

The communication device 20 communicates with other vehicles around the own vehicle M, a parking lot management device or various server devices using, for example, a cellular network, a Wi-Fi network, Bluetooth (registered trademark), dedicated short range communication (DSRC) or the like. The details of a function of the parking lot management device will be described later.

The HMI 30 presents various types of information to occupants of the own vehicle M and receives input operations by the occupants. For example, the HMI 30 includes various display devices, speakers, buzzers, touch panels, switches, and keys.

The vehicle sensor 40 includes a vehicle speed sensor that detects a speed of the own vehicle M, an acceleration sensor that detects acceleration, a yaw rate sensor that detects angular velocity around a vertical axis, and an azimuth sensor that detects a direction of the own vehicle M.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include curvatures of roads and point of interest (POI) information.

The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a present position and a destination to a navigation server via the communication device 20 to acquire the same route as the route on the map from the navigation server.

The MPU 60 includes, for example, a recommended lane determiner 61 and retains second map information 62 in a storage device such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left.

When there is a branching location in the route on the map, the recommended lane determiner 61 determines a recommended lane so that the own vehicle M can travel in a reasonable route to move to a branching destination.

The second map information 62 is map information that has higher precision than the first map information 54. The second map information 62 includes, for example, information regarding the middle of lane or information regarding boundaries of lanes. The second map information 62 may include road information, traffic regulation information, address information (address and postal number), facility information, and telephone number information. The second map information 62 may be updated frequently by communicating with another device using the communication device 20.

The headlight 70 radiates light (projection image) toward the front side of the own vehicle M. The headlight 70 is mounted in a front portion of the body of the own vehicle M. The headlight 70 has, for example, a function of notifying a user of the vehicle of a stop position of the vehicle in a returning process of automated valet parking in addition to a function of improving visibility of the front side in driving by radiating light toward the front side of the own vehicle M at night or the like. The headlight 70 includes, for example, a light source 71 and an actuator 72. The light source 71 is, for example, a valve such as a halogen lamp or a light emitting diode (LED). The actuator 72 controls a projection direction and a projection position of the projection image output by the light source 71 by changing the direction of the light source 71. The actuator 72 includes an activation mechanism (a rotational mechanism or the like) changing a direction of the light source 71 and a driving mechanism or the like such as an electric motor. By controlling the actuator 72, the projection direction and the projection position of the projection image output by the light source 71 can be set to any direction and position on the front side of the own vehicle M.

Figure 2:
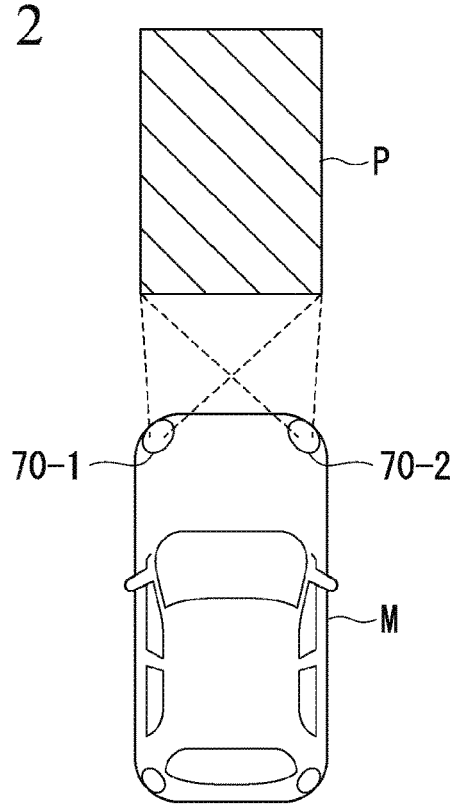
FIG. 2 is a diagram showing an example of a projection process by a headlight according to the first embodiment.

FIG. 2 is a diagram showing an example of a projection process by the headlight 70 according to the first embodiment.

As shown, the headlight 70 includes, for example, a left headlight 70-1 disposed left on the front side of the own vehicle and a right headlight 70-2 disposed right on the front side of the own vehicle M, when the own vehicle M is viewed from the upper side. The left headlight 70-1 and the right headlight 70-2 can project a projection image P to a desired position in front of the own vehicle M in cooperation or alone. For example, the left headlight 70-1 and the right headlight 70-2 can project the projection image P to a ground surface by radiating light to the ground surface at the desired position in front of the own vehicle M.

The indicator 80 notifies persons (for example, traffic participants, users of vehicles, and the like) outside the vehicle of a driving state of the own vehicle M. The indicator 80 is, for example, a turn signal, a fog light (a fog lamp), a side light (a side marker lamp), a brake lamp (a brake light), or the like.

The driving operator 90 includes, for example, an accelerator pedal, a brake pedal, a shift lever, a steering wheel, a steering with a different shape, a joystick, and other operators. A sensor that detects whether there is an operation or an operation amount is mounted in the driving operator 90 and a detection result is output to the automated driving control device 100 or some or all of the travel driving force output device 200, the brake device 210, and the steering device 220.

The automated driving control device 100 includes, for example, a first controller 120, a second controller 160, and a third controller 170. Each of the first controller 120, the second controller 160, and the third controller 170 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as an HDD or a flash memory of the automated driving control device 100 or may be stored in a storage medium (a non-transitory storage medium) detachably mounted on a DVD, a CD-ROM, or the like so that the storage medium is mounted on a drive device to be installed on the HDD or the flash memory of the automated driving control device 100.

Figure 3:
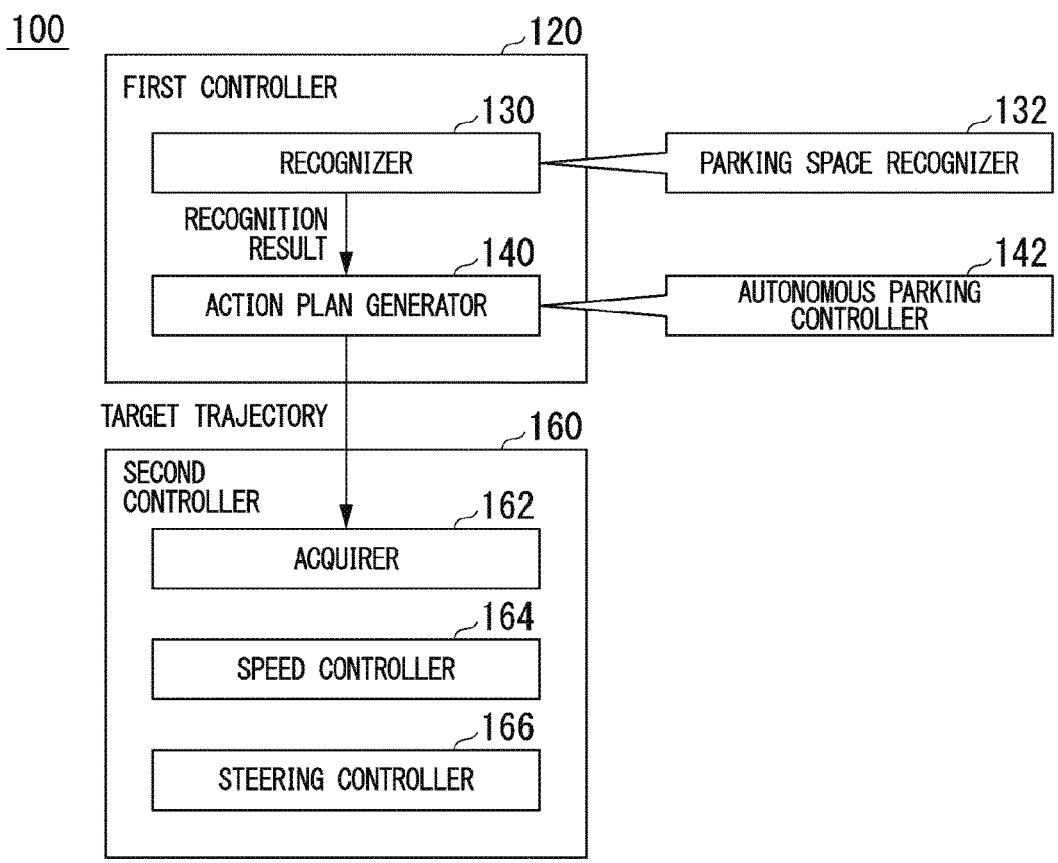
FIG. 3 is a diagram showing a functional configuration of a first controller and a second controller according to the first embodiment.

FIG. 3 is a diagram showing a functional configuration of the first controller 120 and the second controller 160 according to the first embodiment. The first controller 120 includes, for example, a recognizer 130 and an action plan generator 140. The first controller 120 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 recognizes states such as positions, speeds, or acceleration of objects around the own vehicle M based on information input from the camera 10, the radar device 12, and the finder 14 via the object recognition device 16. For example, the positions of the objects are recognized as positions on the absolute coordinates in which a representative point (a center of gravity, a center of a driving shaft, or the like) of the own vehicle M is the origin and are used for control. The positions of the objects may be represented as representative points such as centers of gravity, corners, or the like of the objects or may be represented as expressed regions. A "state" of an object may include acceleration or jerk of the object or an "action state" (for example, whether a vehicle is changing a lane or is attempting to change the lane).

The recognizer 130 recognizes, for example, a lane (a travel lane) in which the own vehicle M is traveling. For example, the recognizer 130 recognizes the travel lane by comparing patterns of road mark lines (for example, arrangement of continuous lines and broken lines) obtained from the second map information 62 with patterns of road mark lines around the own vehicle M recognized from images captured by the camera 10.

The recognizer 130 may recognize a travel lane by mainly recognizing runway boundaries (road boundaries) including road mark lines or shoulders, curbstones, median strips, and guardrails without being limited to road mark lines. In this recognition, the position of the own vehicle M acquired from the navigation device 50 or a process result by INS may be added. The recognizer 130 recognizes temporary stop lines, obstacles, red signals, toll gates, and other road events.

The recognizer 130 recognizes a position or a posture of the own vehicle M with respect to the travel lane when the recognizer 130 recognizes the travel lane. For example, the recognizer 130 may recognize a deviation from the middle of a lane of a standard point of the own vehicle M and an angle formed with a line extending along the middle of a lane in the travel direction of the own vehicle M as a relative position and posture of the own vehicle M to the travel lane. Instead of this, the recognizer 130 may recognize a position or the like of the standard point of the own vehicle M with respect to a side end portion (a road mark line or a road boundary) of any travel lane as the relative position of the own vehicle M to the travel lane.

The recognizer 130 includes a parking space recognizer 132 that is activated in an autonomous parking event to be described below. The details of the function of the parking space recognizer 132 will be described later.

The action plan generator 140 generates a target trajectory along which the own vehicle M travels in future automatically (irrespective of an operation of a driver or the like) so that the own vehicle M is traveling along a recommended lane determined by the recommended lane determiner 61 and handles a surrounding situation of the own vehicle M in principle. The target trajectory includes, for example, a speed component. For example, the target trajectory is expressed by arranging spots (trajectory points) at which the own vehicle M will arrive in sequence. The trajectory point is a spot at which the own vehicle M will arrive for each predetermined travel distance (for example, about several [m]) in a distance along a road. Apart from the trajectory points, target acceleration and a target speed are generated as parts of the target trajectory for each of predetermined sampling times (for example, about a decimal point of a second). The trajectory point may be a position at which the own vehicle M will arrive at the sampling time for each predetermined sampling time. In this case, information regarding the target acceleration or the target speed is expressed according to an interval between the trajectory points.

The action plan generator 140 may set an automated driving event when the target trajectory is generated. As the automated driving event, there are a constant speed traveling event, a low speed track traveling event, a lane changing event, a branching event, a joining event, a takeover event, valet parking, an autonomous parking event in which unmanned traveling and parking are performed, and the like. The action plan generator 140 generates the target trajectory in accordance with an activated event. The action plan generator 140 includes an autonomous parking controller 142 that is activated when an autonomous parking event is performed. The details of a function of the autonomous parking controller 142 will be described later.

The second controller 160 controls the travel driving force output device 200, the brake device 210, and the steering device 220 so that the own vehicle M passes along the target trajectory generated by the action plan generator 140 at a scheduled time.

Referring back to FIG. 3, the second controller 160 includes, for example, an acquirer 162, a speed controller 164, and a steering controller 166. The acquirer 162 acquires information regarding the target trajectory (trajectory points) generated by the action plan generator 140 and stores the information in a memory (not shown). The speed controller 164 controls the travel driving force output device 200 or the brake device 210 based on a speed element incidental to the target trajectory stored in the memory. The steering controller 166 controls the steering device 220 in accordance with a curve state of the target trajectory stored in the memory. Processes of the speed controller 164 and the steering controller 166 are realized, for example, by combining feed-forward control and feedback control. For example, the steering controller 166 performs the feed-forward control in accordance with a curvature of a road in front of the own vehicle M and the feedback control based on separation from the target trajectory in combination.

The travel driving force output device 200 outputs a travel driving force (torque) for traveling the vehicle to driving wheels. The travel driving force output device 200 includes, for example, a combination of an internal combustion engine, an electric motor and a transmission, and an electronic controller (ECU) controlling these units. The ECU controls the foregoing configuration in accordance with information input from the second controller 160 or information input from the driving operator 90.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 90 such that a brake torque in accordance with a brake operation is output to each wheel. The brake device 210 may include a mechanism that transmits a hydraulic pressure generated in response to an operation of the brake pedal included in the driving operator 90 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of steering wheels. The steering ECU drives the electric motor to change the direction of the steering wheels in accordance with information input from the second controller 160 or information input from the driving operator 90.

[Autonomous Parking Event: At Time of Entrance]

Figure 4:
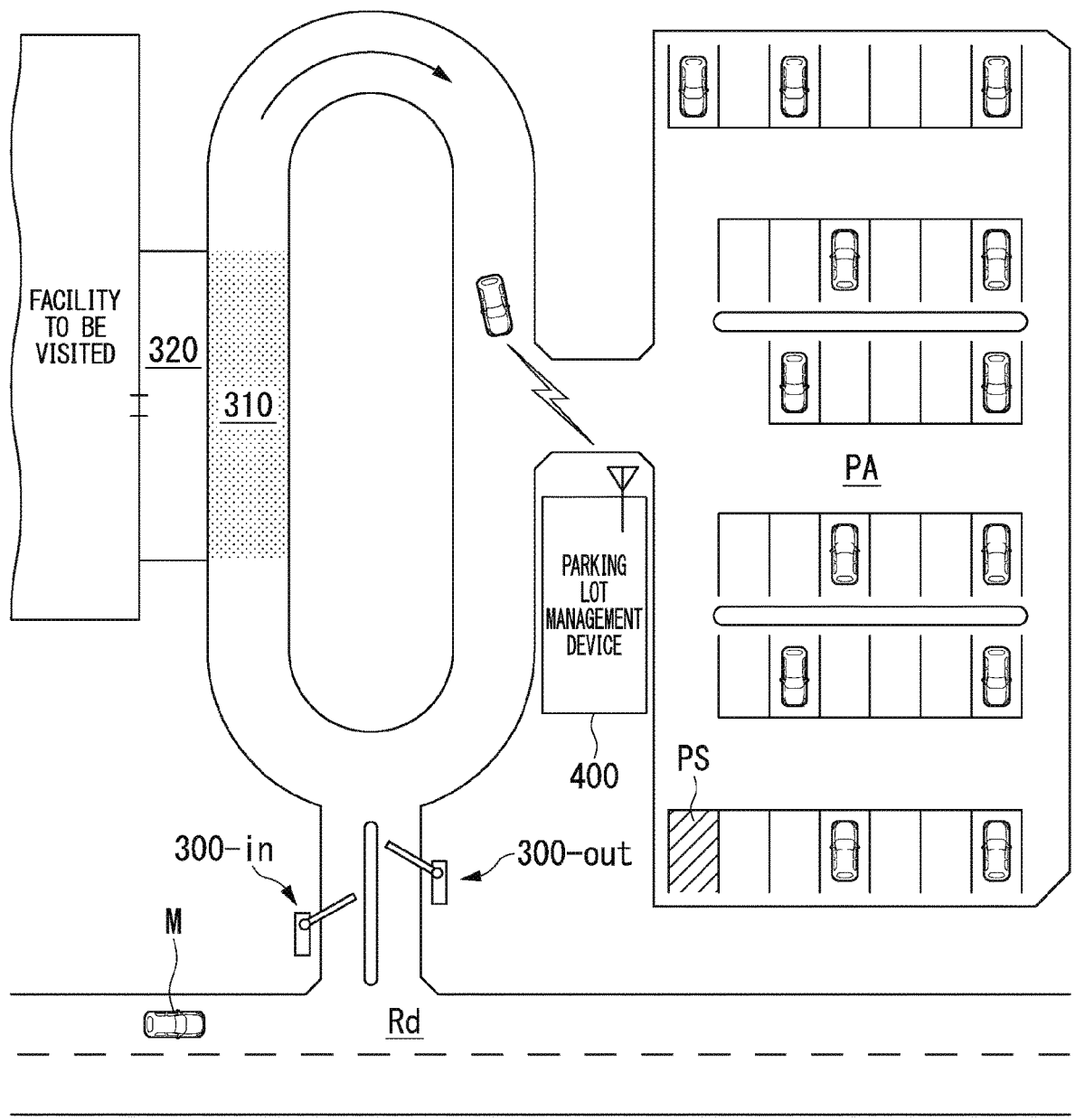
FIG. 4 is a diagram schematically showing a scenario in which an autonomous parking event according to the first embodiment is performed.

For example, the autonomous parking controller 142 parks the own vehicle M in a parking space based on information acquired from a parking lot management device 400 through the communication device 20. FIG. 4 is a diagram schematically showing a scenario in which an autonomous parking event according to the first embodiment is performed. Gates 300-in and 300-out are provided on a route from a road Rd to a facility to be visited. The own vehicle M passes through the gate 300-in through manual driving or automated driving and enters to a stop area 310. The stop area 310 faces a boarding area 320 connected to the facility to be visited. In the boarding area 320, an eave is provided to avoid rain and snow.

After an occupant gets out of a vehicle in the stop area 310, the own vehicle M performs unmanned automated driving and starts an autonomous parking event for moving to a parking space PS in the parking area PA. A trigger to start the autonomous parking event may be, for example, any operation by the occupant or may be wireless reception of a predetermined signal from the parking lot management device 400. When the autonomous parking event starts, the autonomous parking controller 142 controls the communication device 20 such that a parking request is transmitted to the parking lot management device 400. Then, the own vehicle M moves in accordance with guidance of the parking lot management device 400 or moves performing sensing by itself from the stop area 310 to the parking area PA.

Figure 5:
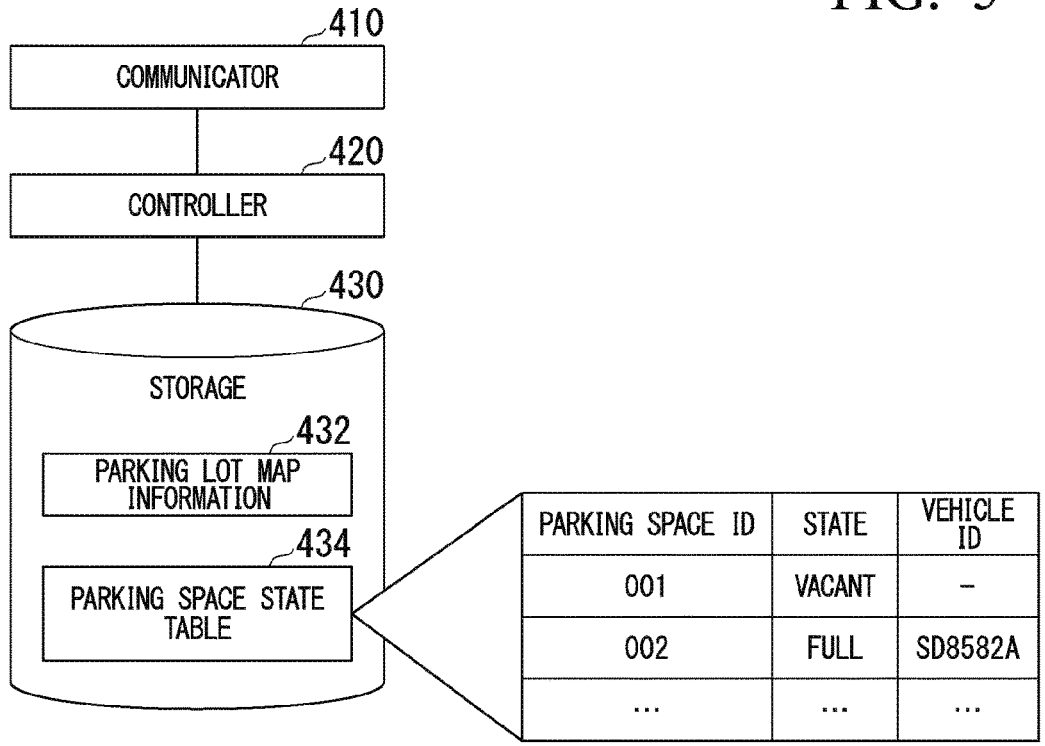
FIG. 5 is a diagram showing an example of a configuration of a parking lot management device according to the first embodiment.

FIG. 5 is a diagram showing an example of a configuration of the parking lot management device 400 according to the first embodiment. The parking lot management device 400 includes, for example, a communicator 410, a controller 420, and a storage 430. The storage 430 stores information such as parking lot map information 432 and a parking space state table 434.

The communicator 410 communicates with the own vehicle M and other vehicles wirelessly. The controller 420 guides a vehicle to the parking space PS based on information acquired by the communicator 410 and information stored in the storage 430. The parking lot map information 432 is information that geometrically represents a structure of the parking area PA. The parking lot map information 432 includes coordinates of each parking space PS. In the parking space state table 434, for example, a state which indicates a vacant state and a full (parking) state and a vehicle ID which is identification information of a vehicle parked in the case of the full state are associated with a parking space ID which is identification information of the parking space PS.

When the communicator 410 receives a parking request from a vehicle, the controller 420 extracts the parking space PS of which a state is a vacant state with reference to the parking space state table 434, acquires a position of the extracted parking space PS from the parking lot map information 432, and transmits a suitable route to the acquired position of the parking space PS to the vehicle through the communicator 410. The controller 420 instructs a specific vehicle to stop or move slowly, as necessary, based on a positional relation between a plurality of vehicles so that the vehicles do not simultaneously advance to the same position.

In a vehicle receiving the route (hereinafter, assumed to be the own vehicle M), the autonomous parking controller 142 generates a target trajectory based on the route. When the own vehicle M approaches the parking space PS which is a target, the parking space recognizer 132 recognizes parking frame lines or the like marking the parking space PS, recognizes a detailed position of the parking space PS, and supplies the detailed position of the parking space PS to the autonomous parking controller 142. The autonomous parking controller 142 receives the detailed position of the parking space PS, corrects the target trajectory, and parks the own vehicle M in the parking space PS.

The present invention is not limited to the above description, the autonomous parking controller 142 may find an empty parking space by itself based on a detection result by the camera 10, the radar device 12, the finder 14, or the object recognition device 16 irrespective of communication and may cause the own vehicle M to park in the found parking space.

[Autonomous Parking Event: Time of Return]

The autonomous parking controller 142 and the communication device 20 are maintained in an operation state even while the own vehicle M is parked. For example, when the communication device 20 receives a pickup request from a terminal device of an occupant, the autonomous parking controller 142 activates a system of the own vehicle M and causes the own vehicle M to move to the stop area 310. At this time, the autonomous parking controller 142 controls the communication device 20 to transmit a launch request to the parking lot management device 400. The controller 420 of the parking lot management device 400 instructs a specific vehicle to stop or move slowly, as necessary, based on a positional relation between a plurality of vehicles so that the vehicles do not simultaneously enter to the same position, as in the time of entrance.

When the own vehicle M is caused to move to the stop area 310 and picks up the occupant, the autonomous parking controller 142 stops the operation. Thereafter, manual driving or automated driving by another functional unit starts.

[Autonomous Parking Event: Boarding Support Event at Time of Return]

Figure 6:
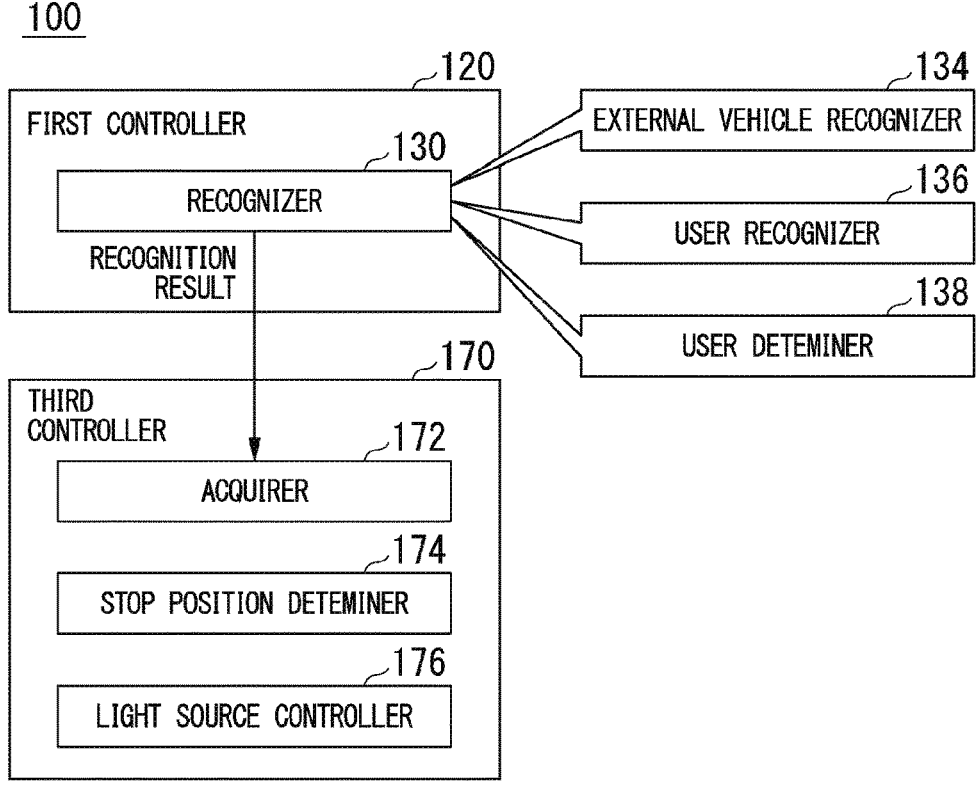
FIG. 6 is a diagram showing a functional configuration of the first controller and a third controller according to the first embodiment.

FIG. 6 is a diagram showing a functional configuration of the first controller 120 and the third controller 170 according to the first embodiment. The recognizer 130 with which the first controller 120 is equipped includes, for example, an external vehicle recognizer 134 (a second recognizer), a user recognizer 136 (a first recognizer), and a user determiner 138 (a first determiner) activated in a boarding support event for notifying a user of the own vehicle M of a stop position at the time of return. The external vehicle recognizer 134 recognizes an external vehicle (an example of an object) located in the stop area 310 based on information input from the camera 10, the radar device 12, and the finder 14 via the object recognition device 16. For example, the external vehicle recognizer 134 recognizes presence or absence and a position of the external device located in the stop area 310.

The user recognizer 136 recognizes persons near the own vehicle M (for example, in a boarding area 320 (area) of a destination that the own vehicle M enters) based on information input from the camera 10 via the object recognition device 16. For example, the user recognizer 136 performs an analysis process on a captured image of the boarding area 320 captured by the camera 10 and recognizes persons in the boarding area 320 (persons contained in the captured image). For example, the user recognizer 136 recognizes persons contained in the captured image using a scheme such as template matching.

The user determiner 138 determines whether any of the persons recognized by the user recognizer 136 is a pre-registered user of the own vehicle M. For example, the user determiner 138 determines whether the user of the own vehicle M is included among the persons recognized by the user recognizer 136 by storing an image (for example, a facial image) of the user of the own vehicle M in advance and comparing the facial images of the persons recognized by the user recognizer 136 with the facial image of the pre-registered user of the own vehicle M. A model for executing user determination may be prepared by learning an image of the user of the own vehicle M in advance using AI technology such as deep learning, and a captured image captured by the camera 10 may be input to the model as input data to determine whether information indicating the user of the own vehicle M is included in the captured image.

Further, the user determiner 138 detects the position of the user when the user determiner 138 determines that the person recognized by the user recognizer 136 is the pre-registered user of the own vehicle M. For example, the user determiner 138 detects the position of the user based on information input from the camera 10, the radar device 12, and the finder 14 via the object recognition device 16. The user recognizer 136 may recognize the position of the user based on positional information of the terminal device transmitting a pickup request.

The third controller 170 determines a stop position of the own vehicle M in the stop area 310 based on a recognition result of an external vehicle by the external vehicle recognizer 134, a recognition result of the user by the user recognizer 136, and a determination result by the user determiner 138 and controls the headlight 70 such that the projection image is projected to a position for which the determined stop position is a criterion.

The third controller 170 includes, for example, an acquirer 172, a stop position determiner 174 (a second determiner), and a light source controller 176 (a controller). The acquirer 172 acquires a recognition result of the external vehicle by the external vehicle recognizer 134, the recognition result of the user by the user recognizer 136, and the determination result by the user determiner 138 and stores these results in a memory (not shown).

The stop position determiner 174 determines a stop position of the own vehicle M in the stop area 310 based on the recognition result of the external vehicle acquired by the acquirer 172, the recognition result of the user, and the determination result of the user. For example, the stop position determiner 174 determines a position in the stop area 310 in which the position of the user of the own vehicle M is a criterion as the stop position of the own vehicle M. Hereinafter, the position in the stop area 310 in which the position of the user is the criterion is referred simply to as a "position of the user" in some cases. The details of a function of the stop position determiner 174 will be described later.

The light source controller 176 controls the headlight 70 such that the projection image is projected to a position for which the stop position determined by the stop position determiner 174 is a criterion. The details of a function of the light source controller 176 will be described later.

[Operation Flow of Boarding Support Event]

Figure 7:
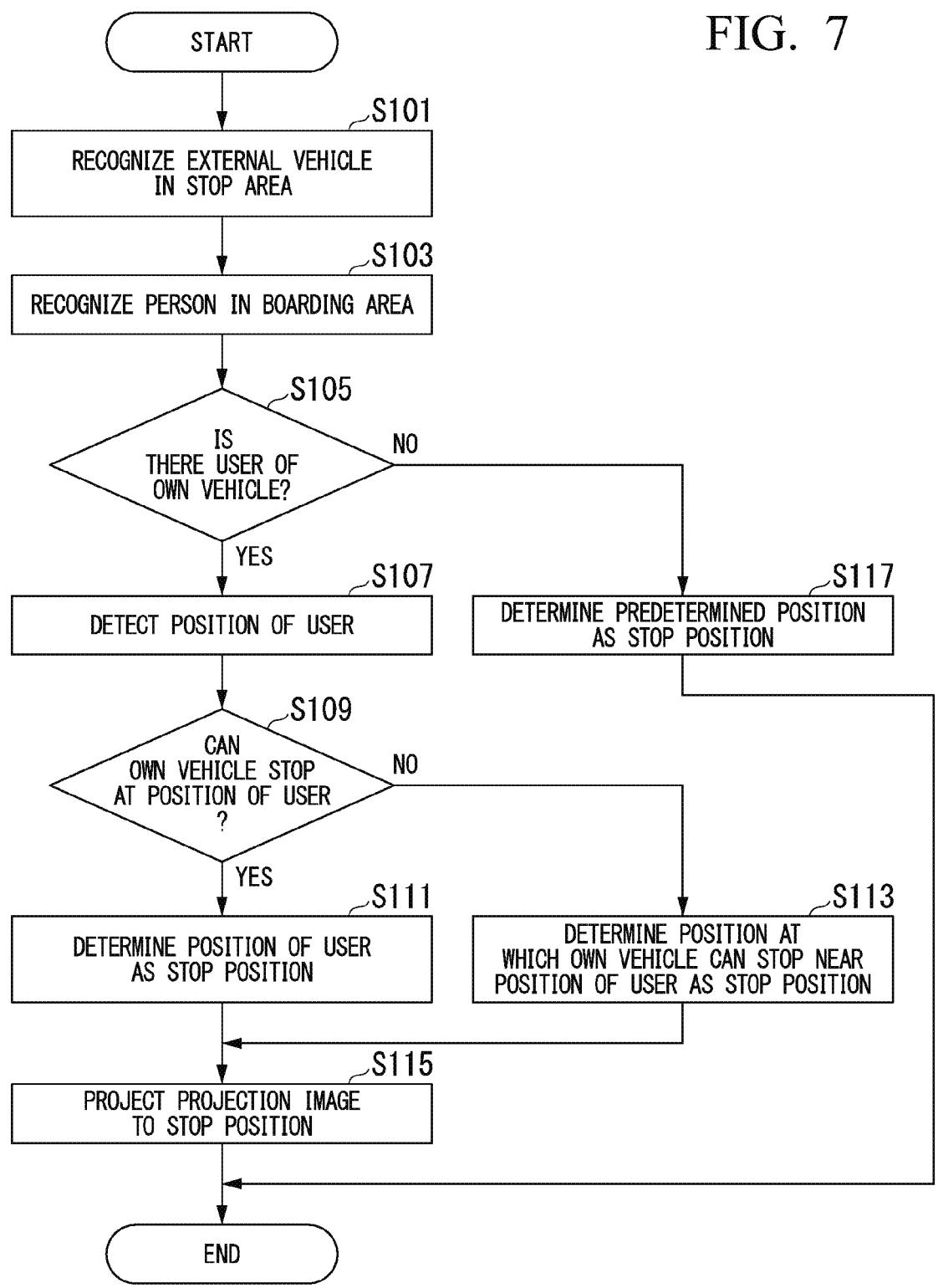
FIG. 7 is a flowchart showing an example of an operation flow of a boarding support event of an automated driving control device according to the first embodiment.
Figure 9:
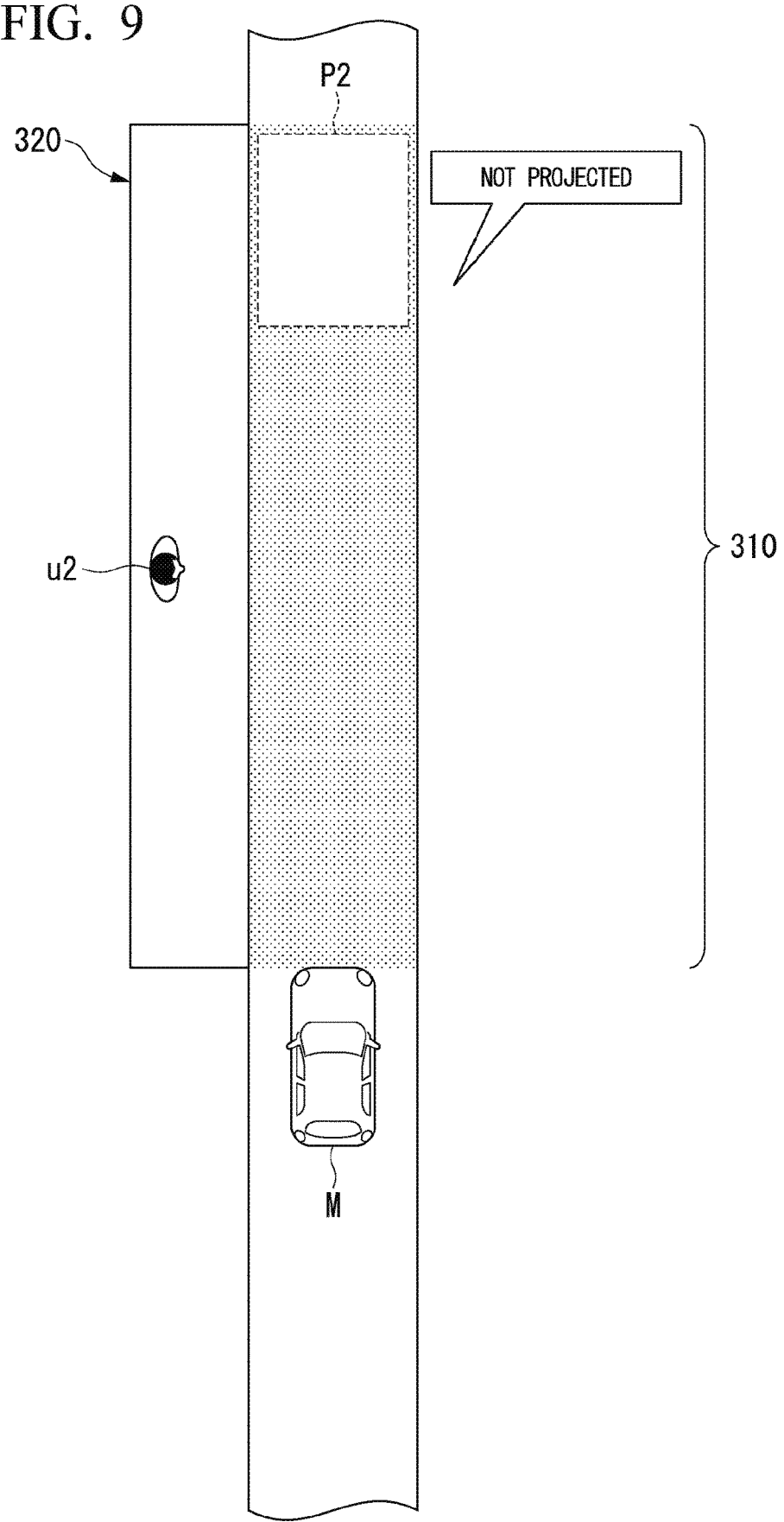
FIG. 9 is a diagram schematically showing an example of the scenario in which the boarding support event of the automated driving control device according to the first embodiment is performed.
Figure 10:
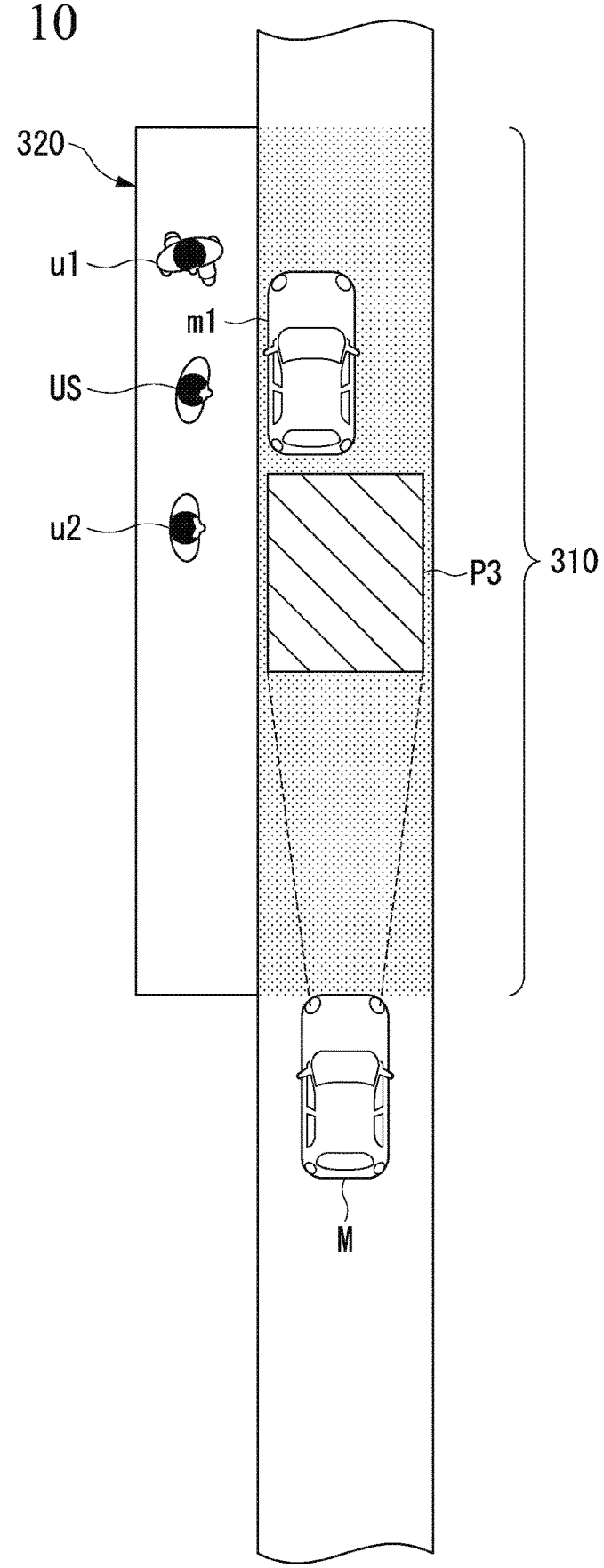
FIG. 10 is a diagram schematically showing an example of the scenario in which the boarding support event of the automated driving control device according to the first embodiment is performed.

An operation of the foregoing boarding support event will be described. FIG. 7 is a diagram showing an example of an operation flow of the boarding support event of the automated driving control device 100 according to the first embodiment. The operation flow starts, for example, using detection of approach of the stop area 310 by the automated driving control device 100 as a trigger after the communication device 20 receives a pickup request transmitted from the terminal device of the user and movement of the own vehicle M to the stop area 310 starts. Each of FIGS. 8 to 10 is a diagram schematically showing an example of a scenario in which the boarding support event of the automated driving control device 100 according to the first embodiment is performed.

First, the external vehicle recognizer 134 recognizes an external vehicle located in the stop area 310 based on information input from the camera 10, the radar device 12, and the finder 14 via the object recognition device 16 (step S101). For example, the external vehicle recognizer 134 detects presence or absence of the external vehicle, the position of the external vehicle, and the like.

Subsequently, the user recognizer 136 recognizes a person in the boarding area 320 of a destination that the own vehicle M enters based on the information input from the camera 10 via the object recognition device 16 (step S103). Subsequently, the user determiner 138 determines whether the person recognized by the user recognizer 136 is the pre-registered user of the own vehicle M (step S105).

Figure 8:
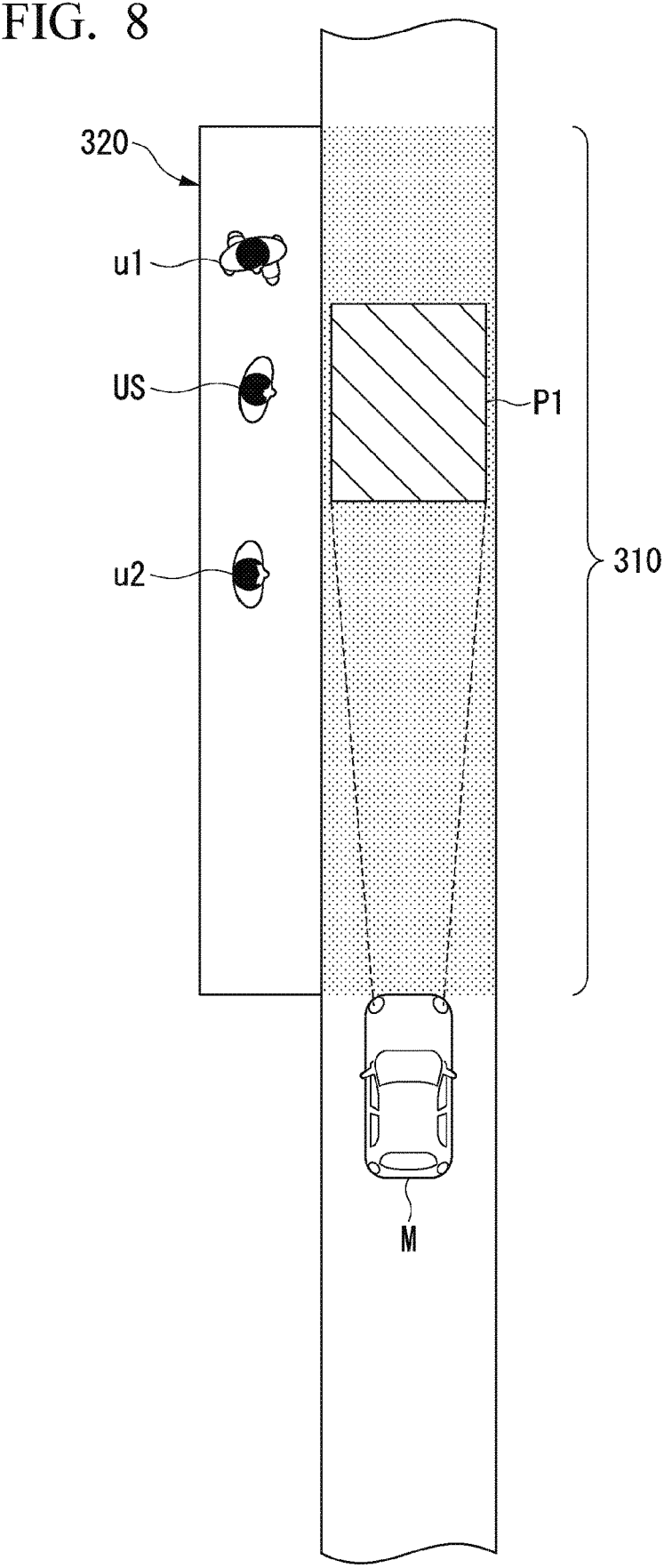
FIG. 8 is a diagram schematically showing an example of a scenario in which the boarding support event of the automated driving control device according to the first embodiment is performed.

FIG. 8 shows an example in which a user US of the own vehicle M and other persons u1 and u2 who are not the user US are in the boarding area 320. In this case, the user recognizer 136 recognizes three people (the user US and the other people u1 and u2) who are in the boarding area 320. Then, the user determiner 138 determines that the user US who is one of the three people recognized by the user recognizer 136 is the pre-registered user of the own vehicle M.

On the other hand, FIG. 9 shows an example in which only the other person u2 who is not the user US of the own vehicle M is in the boarding area 320. In this case, the user recognizer 136 recognizes one person (the other person u2) who is in the boarding area 320. Then, the user determiner 138 determines that the other person u2 recognized by the user recognizer 136 is not the pre-registered user of the own vehicle M.

When the user determiner 138 determines that the person recognized by the user recognizer 136 is the pre-registered user of the own vehicle M (YES in step S105), the position of the user is detected based on the information input from the camera 10, the radar device 12, and the finder 14 via the object recognition device 16 (step S107).

Subsequently, the stop position determiner 174 determines whether the own vehicle M can stop at the position of the user detected by the user recognizer 136 (step S109). In the example shown in FIG. 8, since there is no object (for example, an external vehicle or the like) disturbing stop at the position of the user US, the own vehicle M can be stopped at the position of the user US. In this case, the stop position determiner 174 determines that the own vehicle M can stop at the position of the user. Conversely, in an example shown in FIG. 10, since an external vehicle m1 is stopped at the position of the user US, the own vehicle M cannot be stopped at the position of the user US. In this case, the stop position determiner 174 determines that the own vehicle M cannot stop at the position of the user.

As shown in FIG. 8, when the stop position determiner 174 determines that the own vehicle M can stop at the position of the user (YES in step S109), the stop position determiner 174 determines the position of the user as a stop position P1 (step S111). Then, the light source controller 176 controls the headlight 70 such that the projection image is projected to a position for which the stop position P1 determined by the stop position determiner 174 is a criterion (step S115).

Conversely, as shown in FIG. 10, when the stop position determiner 174 determines that the own vehicle M cannot stop at the position of the user (NO in step S109), the stop position determiner 174 determines a position at which the own vehicle M can stop near the position of the user (a position behind the external terminal m1) as a stop position P3 (step S113). Then, the light source controller 176 controls the headlight 70 such that the projection image is projected to the stop position P3 determined by the stop position determiner 174 (step S115).

As shown in FIG. 9, when the user determiner 138 determines that the person recognized by the user recognizer 136 is not the pre-registered user of the own vehicle M (NO in step S105) or the user recognizer 136 recognizes no person in the boarding area 320, for example, the user determiner 138 determines a predetermined position such as a lead position of the stop area 310 as a stop position P2 (step S117). In this case, since the user of the own vehicle M who is a target for notification of the stop position is not present, it is not necessary for the headlight 70 to notify of the stop position. Therefore, the light source controller 176 does not control the headlight 70.

According to the above-described first embodiment, by notifying the user of the vehicle of the stop position, it is possible to realize efficient boarding. The user of the vehicle can be aware of a position at which the vehicle stops in the boarding area, and thus it is possible to avoid unnecessary movement in the boarding area and shorten a boarding time. The user can be recognized by the vehicle. Thus, by determining the stop position based on the position of the user of the vehicle, it is possible to realize more efficient boarding.

Second Embodiment

Hereinafter, a second embodiment will be described. An automated driving control device 100 according to the second embodiment differs from that of the first embodiment in that an operation mode of an indicator is changed based on a distance between the present position and the stop position of the own vehicle M in addition to the projection of the projection image indicating a stop position. Therefore, the drawings and description of the first embodiment can be referred to for the configuration and the like, and detailed description will be omitted.

[Operation Flow of Boarding Support Event]

Figure 11:
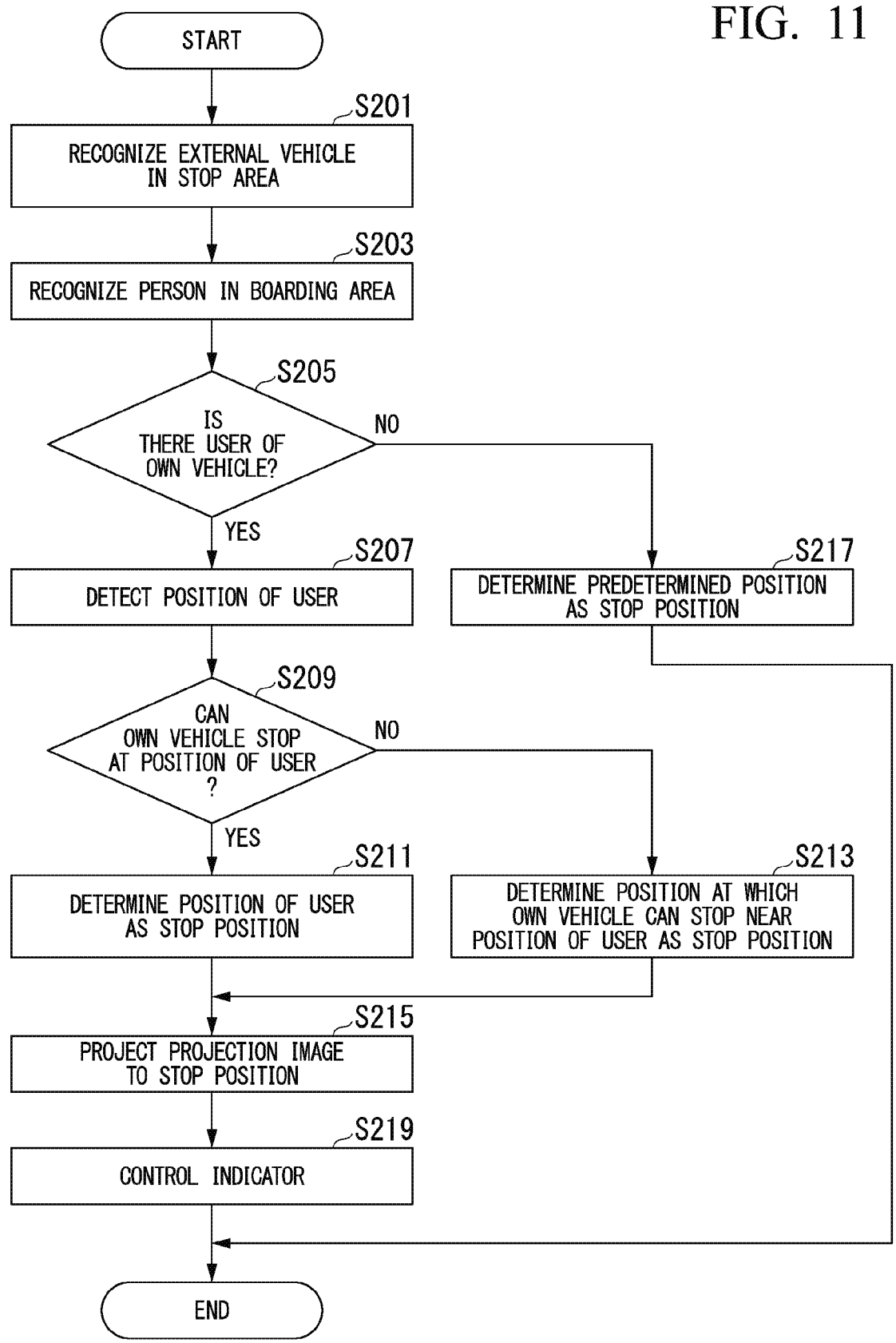
FIG. 11 is a flowchart showing an example of an operation flow of a boarding support event of an automated driving control device according to a second embodiment.

FIG. 11 is a flowchart showing an example of an operation flow of a boarding support event of the automated driving control device 100 according to the second embodiment. The operation flow starts, for example, using detection of approach of the stop area 310 by the automated driving control device 100 as a trigger after the communication device 20 receives a pickup request transmitted from the terminal device of the user and movement of the own vehicle M to the stop area 310 starts.

First, the external vehicle recognizer 134 recognizes an external vehicle located in the stop area 310 based on information input from the camera 10, the radar device 12, and the finder 14 via the object recognition device 16 (step S201).

Subsequently, the user recognizer 136 recognizes a person in the boarding area 320 of a destination that the own vehicle M enters based on the information input from the camera 10 via the object recognition device 16 (step S203). Subsequently, the user determiner 138 determines whether the person recognized by the user recognizer 136 is the pre-registered user of the own vehicle M (step S205).

When the user determiner 138 determines that the person recognized by the user recognizer 136 is the pre-registered user of the own vehicle M (YES in step S205), the position of the user is detected based on the information input from the camera 10, the radar device 12, and the finder 14 via the object recognition device 16 (step S207).

Subsequently, the stop position determiner 174 determines whether the own vehicle M can stop at the position of the user detected by the user recognizer 136 (step S209).

When the stop position determiner 174 determines that the own vehicle M can stop at the position of the user (YES in step S209), the stop position determiner 174 determines the position of the user as a stop position P1 (step S211). Conversely, when the stop position determiner 174 determines that the own vehicle M cannot stop at the position of the user (NO in step S209), the stop position determiner 174 determines a position at which the own vehicle M can stop near the position of the user (for example, a position behind the external terminal) as a stop position (step S213). Then, the light source controller 176 controls the headlight 70 such that the projection image is temporarily projected to the stop position determined by the stop position determiner 174 (step S215). Thereafter, the light source controller 176 controls the headlight 70 such that the own vehicle M stops projecting the projection image. The projection image may be projected continuously until arrival at the stop position instead of being temporary.

Figure 12:
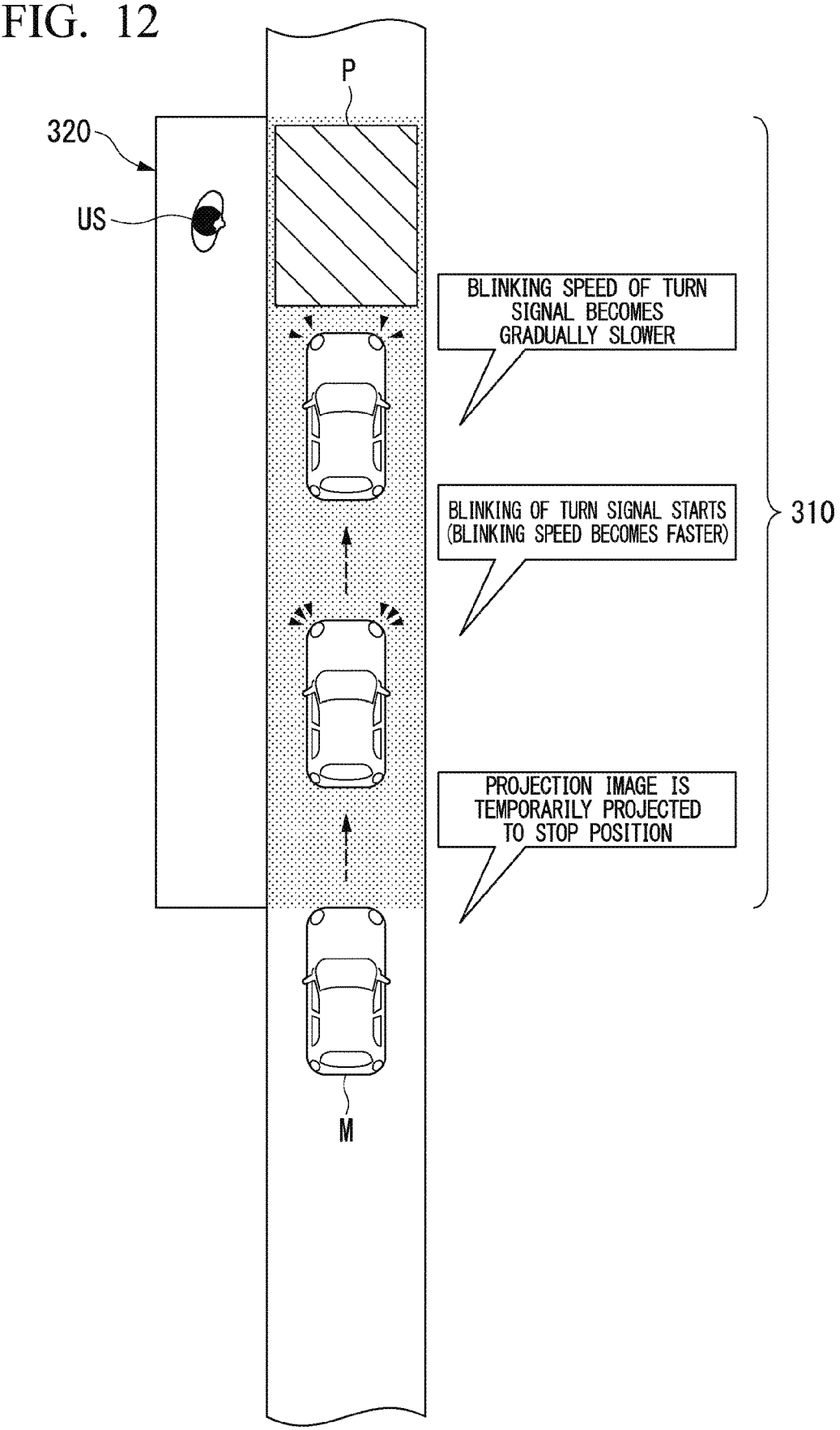
FIG. 12 is a diagram schematically showing an example of a scenario in which the boarding support event of the automated driving control device according to the second embodiment is performed.

Subsequently, after the temporary projection of the projection image by the headlight 70 ends, the light source controller 176 controls the indicator 80 such that the operation mode of the indicator 80 is changed based on a distance between the present position and the stop position of the own vehicle M (step S219). For example, when the indicator 80 is a turn signal, the light source controller 176 controls the turn signal such that a blinking speed of the turn signal is changed based on the distance to the stop position. FIG. 12 is a diagram schematically showing an example of a scenario in which the boarding support event of the automated driving control device 100 according to the second embodiment is performed. As shown, for example, the light source controller 176 controls the turn signal such that the blinking speed of the turn signal gradually becomes slower (or faster) as a distance between a present position of the own vehicle M and the stop position P becomes shorter. When the own vehicle M arrives at the stop position P, the turn signal is controlled such that the blinking of the turn signal ends. The turn signal may be controlled such that only the turn signal close to the boarding area 320 blinks between the left and right turn signals or may be controlled such that the left and right turn signals simultaneously blink (hazard blinking).

When the user determiner 138 determines that the person recognized by the user recognizer 136 is not the pre-registered user of the own vehicle M (NO in step S205) or the user recognizer 136 recognizes no person in the boarding area 320, for example, the user determiner 138 determines a predetermined position such as a lead position of the stop area 310 as a stop position P2 (step S217). In this case, since the user of the own vehicle M who is a target for notification of the stop position is not present, it is not necessary for the headlight 70 to notify of the stop position or for the indicator 80 to notify of an approach situation of the stop position. Therefore, the light source controller 176 does not control the headlight 70 or the indicator 80.

According to the above-described second embodiment, by notifying the user of the vehicle of the stop position, it is possible to realize efficient boarding. The user of the vehicle can be aware of a position at which the vehicle stops in a boarding area, can avoid unnecessary movement in the boarding area, and can shorten a boarding time. It is possible for the vehicle to recognize the user, and thus it is possible to realize efficient boarding by determining a stop position based on the position of the user of the vehicle. Further, by changing the operation mode of the indicator based on the distance between the present position of the vehicle and the stop position, the user of the vehicle can easily and accurately be aware of the operation state of the vehicle until the vehicle arrives at the stop position.

Figure 13:
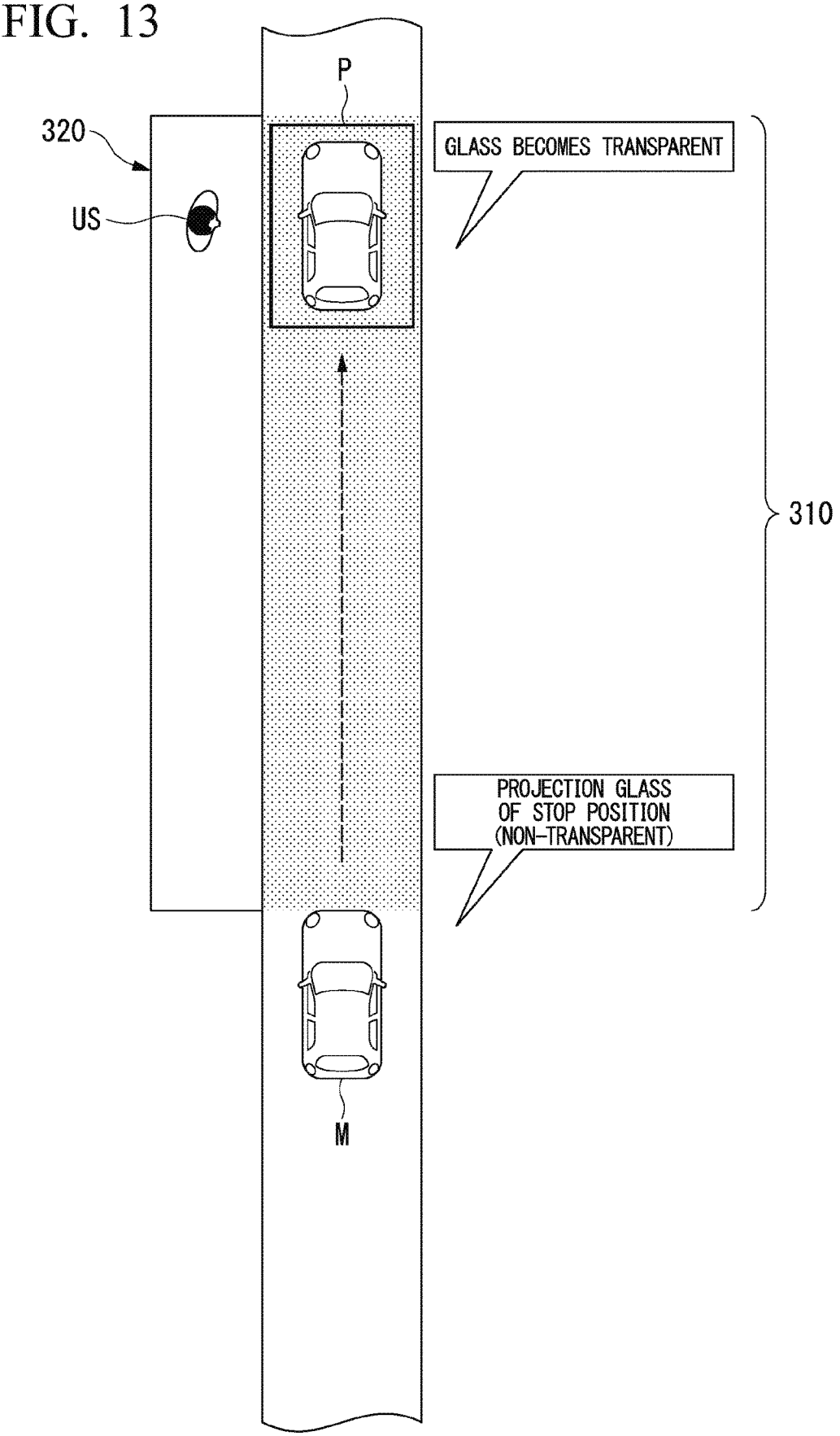
FIG. 13 is a diagram schematically showing an example of a scenario in which a boarding support event of an automated driving control device according to a modification example of the second embodiment is performed.

At the time of return, to provide a notification to the outside of the vehicle that the own vehicle M performs unmanned automated driving, a state (color, transparency, and the like) of a windshield (a front windshield, a side windshield, a rear windshield, or the like) of the own vehicle M may be changed based on a driving state. FIG. 13 is a diagram schematically showing an example of a scenario in which a boarding support event of the automated driving control device 100 according to a modification example of the second embodiment is performed. For example, when the windshield of the own vehicle M becomes non-transparent (the transparency is lowered) during the unmanned automated driving and the own vehicle M arrives at the stop position P to end the unmanned automated driving (the user can board the vehicle), the windshield may be changed to become transparent (the transparency is raised). For example, by pasting a liquid crystal film of which transparency is changed depending on conduction or non-conduction to the windshield of the own vehicle M and allowing the automated driving control device 100 (for example, the light source controller 176) to control a conduction state of the liquid crystal film, the transparency of the windshield may be variable. The automated driving control device 100 (for example, the light source controller 176) may control the windshield such that the state of the windshield of the own vehicle M which is moving to the stop position under the automated driving control is different from the state of the windshield of the own vehicle M which has arrived at the stop position.

To provide a notification to the outside that the own vehicle M performs the unmanned automated driving, the automated driving control device 100 (for example, the light source controller 176) may control a projection device provided in the own vehicle M such that a 3D polygon (a character or the like) (an image) recognizable from the outside of the own vehicle M is given to the driving seat of the own vehicle M during the unmanned automated driving.

Figure 14:
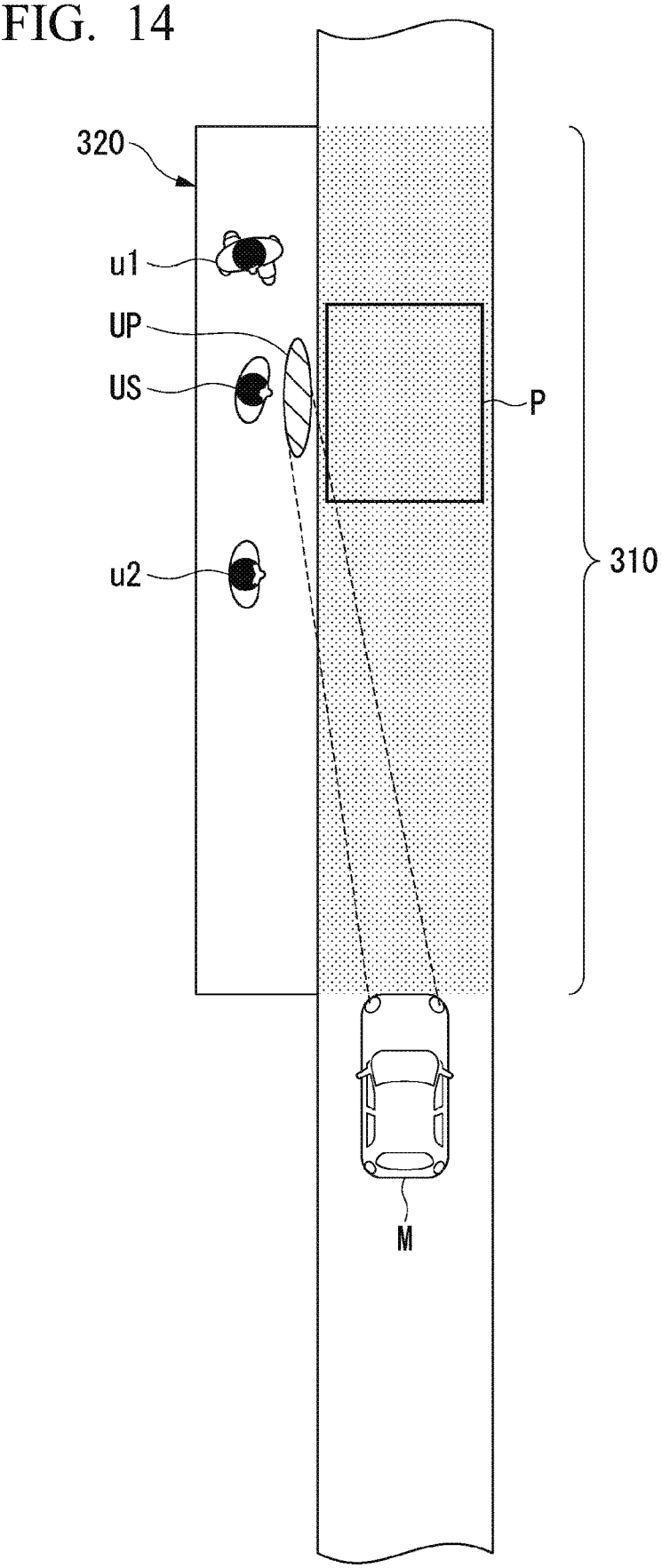
FIG. 14 is a diagram schematically showing an example of a scenario in which a boarding support event of an automated driving control device according to a modification example of the first and second embodiments is performed.

In the foregoing embodiments, the example in which the own vehicle M projects the projection image to the position for which the stop position is the criterion has been described. However, light may be radiated to the position of the user of the own vehicle M. FIG. 14 is a diagram schematically showing an example of a scenario in which a boarding support event of the automated driving control device 100 according to a modification example of the first and second embodiments is performed. As shown, the light source controller 176 may radiate light to a position UP such as the feet, eyes, or the like of the user US instead of or in addition to the projection of the projection image to the position for which the stop position P is the criterion. The light source controller 176 may detect brightness of the outside of the vehicle using an illuminance sensor mounted in the own vehicle M and change a radiation position of the light to the user US based on the brightness. The light source controller 176 controls the headlight 70 such that a body part of the user to which the light is radiated is changed based on illuminance of the outside of the own vehicle M. For example, when the outside of the own vehicle is bright (the illuminance is equal to or greater than a predetermined threshold), the light source controller 176 radiates the light at the feet of the user US. When the outside of the own vehicle is dark (the illuminance is less than the predetermined threshold), the light source controller 176 may control the headlight 70 such that the light is radiated to the vicinity of the eyes of the user US. Thus, the user US can recognize the own vehicle M with a sensation similar to maintaining eye contact with another person and can confirm that the own vehicle M recognizes the user and performs a returning process normally.

In the foregoing embodiments, the example in which the projection image is projected when the own vehicle M is moving under the automated driving control has been described. However, the present invention can also be applied to a case in which the own vehicle M is moving under manual driving control. For example, the stop position may be predicted from a speed change or the like of the own vehicle M moving under manual driving control and the projection image may be projected to the position for which the predicted stop position is a criterion so that the user then boarding the own vehicle M can be notified of the stop position.

[Hardware Configuration]

Figure 15:
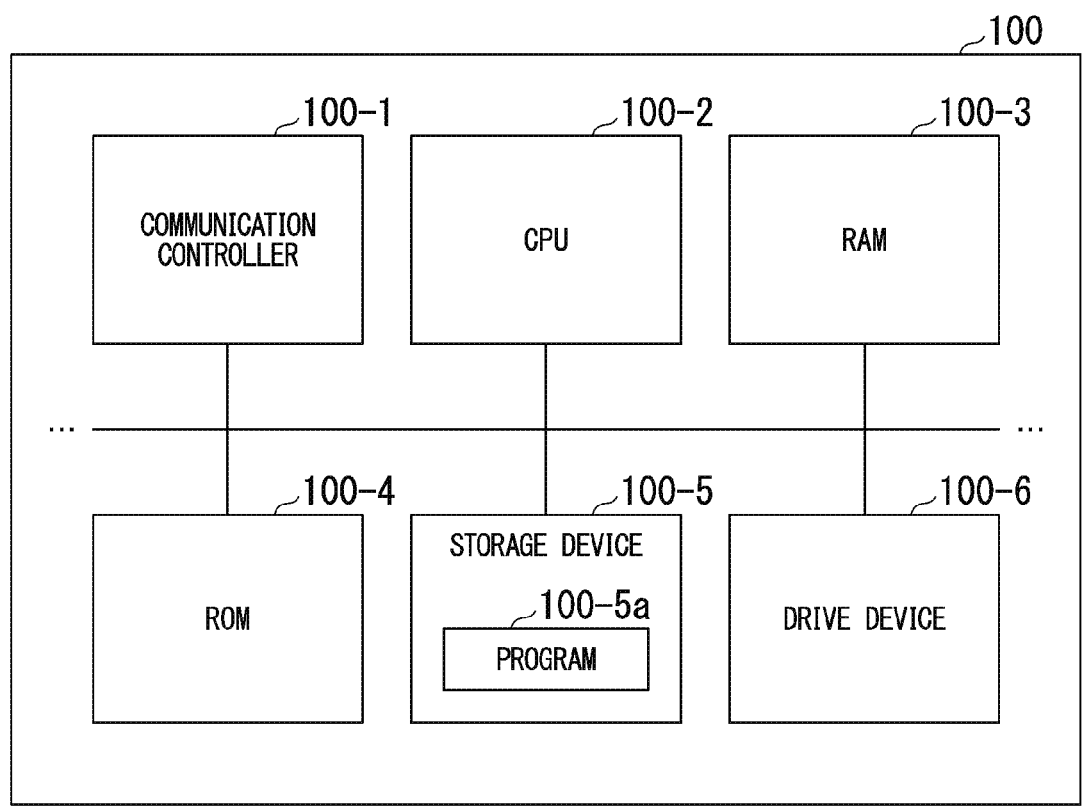
FIG. 15 is a diagram showing an example of a hardware configuration of an automated driving control device according to an embodiment.

FIG. 15 is a diagram showing an example of a hardware configuration of the automated driving control device 100 according to an embodiment. As shown, the automated driving control device 100 (computer) is configured such that a communication controller 100-1, a CPU 100-2, a (random access memory) (RAM) 100-3 that is used as a working memory, a read-only memory (ROM) 100-4 that stores a boot program or the like, a storage device 100-5 such as a flash memory or a hard disk drive (HDD), a drive device 100-6, and the like are connected to each other via an internal bus or a dedicated communication line. The communication controller 100-1 performs communication with constituent element other than the automated driving control device 100. The storage device 100-5 stores a program 100-5*a* that is executed by the CPU 100-2. The program is loaded on the RAM 100-3 by a direct memory access (DMA) controller (not shown) to be executed by the CPU 100-2. Thus, some or all of the first controller 120, the second controller 160, and the third controller 170 are realized.

The above-described embodiment can be expressed as follows:

the vehicle control device mounted in a vehicle consisting of a storage device that stores a program and a hardware processor, the vehicle control device causing the hardware processor to execute the program stored in the storage device, to recognize a person near the vehicle;

to determine whether the recognized person is a pre-registered user; and to control a lighting device such that a projection image is projected to a position for which a stop position of the vehicle is a criterion when the recognized person is determined to be the pre-registered user.

While the embodiments for implementing the present invention have been described using embodiments, the present invention is not limited to these embodiments and various modifications and substitutions can be added without departing from the scope of the present invention.

What is claimed is:

1. A vehicle control device mounted in a vehicle, the vehicle control device comprising:

a first recognizer configured to recognize a person near the vehicle;

a first determiner configured to determine whether the person recognized by the first recognizer is a pre-registered user; and a controller configured to control a lighting device to project a projection image to a position for which a stop position of the vehicle is a criterion in a case where the first determiner determines that the person recognized by the first recognizer is the pre-registered user.

2. The vehicle control device according to claim 1, wherein the controller is configured not to control the lighting device in a case where the first recognizer does not recognize a person or the first determiner determines that the person recognized by the first recognizer is not the pre-registered user.

3. The vehicle control device according to claim 1, further comprising:

a second determiner configured to determine the stop position based on a position of the person determined to be the pre-registered user by the first determiner.

4. The vehicle control device according to claim 3, wherein the second determiner is configured to determine a predetermined position in a stop area as the stop position in a case where the first recognizer does not recognize a person or the first determiner determines that the person recognized by the first recognizer is not the pre-registered user.

5. The vehicle control device according to claim 3, further comprising:

a second recognizer configured to recognize an object which is in the stop area, wherein the second determiner is configured to determine a stoppable position different from a position of the person as the stop position in a case where the first determiner determines that the person recognized by the first recognizer is the pre-determined user and the second recognizer recognizes an object disturbing stopping of the vehicle at the position of the person.

6. The vehicle control device according to claim 1, wherein the controller is configured to control an indicator mounted in the vehicle to change an operation mode of the indicator based on a distance from a present position of the vehicle to the stop position.

7. The vehicle control device according to claim 6, wherein the controller is configured to control the indicator to change a blinking speed of the indicator.

8. The vehicle control device according to claim 6, wherein the controller is configured to control the lighting device to stop the projection of the projection image before the indicator is controlled.

9. The vehicle control device according to claim 1, wherein the controller is configured to control a windshield of the vehicle to make a state of the windshield of the vehicle while the vehicle is moving to the stop position through automated driving control be different from the state of the windshield of the vehicle after the vehicle arrives at the stop position.

10. The vehicle control device according to claim 1, wherein the controller is configured to control a projection device to project an image recognizable from outside of the vehicle to a driving seat of the vehicle while the vehicle is moving to the stop position through automated driving control.

11. The vehicle control device according to claim 1, wherein the controller is configured to control the lighting device to radiate light onto the person determined to be the pre-registered user by the first determiner.

12. The vehicle control device according to claim 11, wherein the controller is configured to control the lighting device to change the radiated light to radiate a different body part of the person determined to be the pre-registered user by the first determiner, based on illuminance outside of the vehicle.

13. A vehicle control method causing a computer of a vehicle control device mounted in a vehicle to:
- recognize a person near the vehicle;
- determine whether the recognized person is a pre-registered user; and
- control a lighting device to project a projection image to a position for which a stop position of the vehicle is a criterion in a case where the recognized person is determined to be the pre-registered user.

14. A computer-readable non-transitory storage medium storing a program that causes a computer of a vehicle control device mounted in a vehicle to:
- recognize a person near the vehicle;
- determine whether the recognized person is a pre-registered user; and
- control a lighting device to project a projection image to a position for which a stop position of the vehicle is a criterion in a case where the recognized person is determined to be the pre-registered user.

\* \* \* \* \*